May 10, 1966 W. MÜLLER 3,250,856

RECORDING AND REPRODUCING APPLIANCE FOR CONNECTION TO A PUBLIC TELEPHONE NETWORK

Filed March 2, 1962 3 Sheets-Sheet 2

United States Patent Office 3,250,856

Patented May 10, 1966

3,250,856

RECORDING AND REPRODUCING APPLIANCE FOR CONNECTION TO A PUBLIC TELEPHONE NETWORK

Willy Müller, 121 Bederstrasse, Zurich, Switzerland

Filed Mar. 2, 1962, Ser. No. 177,093
6 Claims. (Cl. 179—6)

The invention relates to a recording and reproducing appliance connected to a public telephone network, which in telephone operation, when receiving a telephone call, invites the calling subscriber by means of an announcement text to speak, and subsequently, during a predetermined period records a message spoken into it by the caller on a record carrier, and after the lapse of this period informs the caller by means of the announcement text, that the record carrier has been switched off, whereafter the appliance is ready for a new calling cycle, as long as there is still room on the record carrier for the recording of messages.

Known appliances of this kind operate in such a manner that they are automatically put out of operation when no more room for further recordings is available on the record carrier, which is formed for example by a magnetizable drum. From this moment onward the owner of the appliance does not enjoy any advantage over a telephone subscriber without such an appliance.

A further disadvantage of these known appliances consists in that in case of a prolonged absence e.g. of some days the owner is practically forced to switch the appliance off in order to obviate any misleading of the calling subscribers. When the appliance remains switched on and when the announcement text does not contain any information about the duration of the absence, the calling subscriber will believe, that the message he has recorded in response to the invitation to speak, has been listened to by the called subscriber within a useful time, say after several hours. When for example a physician goes away for some days and his appliance invites the caller to speak instead of telling about his absence this may even be fatal in certain circumstances.

The present invention has the main objects of overcoming these disadvantages and of providing an appliance complying with all requirements of practical use.

With these and other objects in view, which will become apparent later from this specification and the accompanying drawings, I provide a recording and reproducing appliance for connection with a public telephone network, comprising in combination: a first announcement carrier and a first transducer head co-operating therewith which on receiving a telephone call automatically invites the calling subscriber to speak, a record carrier and a second transducer head cooperating therewith recording automatically during a pre-determined period a message spoken by the calling subscriber, said first announcement carrier after the lapse of said period automatically informing the calling subscriber that said record carrier is switched off said appliance then being ready for another calling cycle as long as there is space available for recording on said record carrier, a second announcement carrier operatively connected with said first announcement carrier and automatically substituuted for said first announcement carrier when no space is available any more on said record carrier for the recording of further messages, and then transmitting to the calling subscriber a freely variable announcement text, and manually operable control means capabel of substituting said second announcement carrier at will, regardless of the state of recording on said record carrier.

In the accompanying drawings an embodiment of the invention is illustrated by way of example, in which.

Figures 5, 5A, 6:
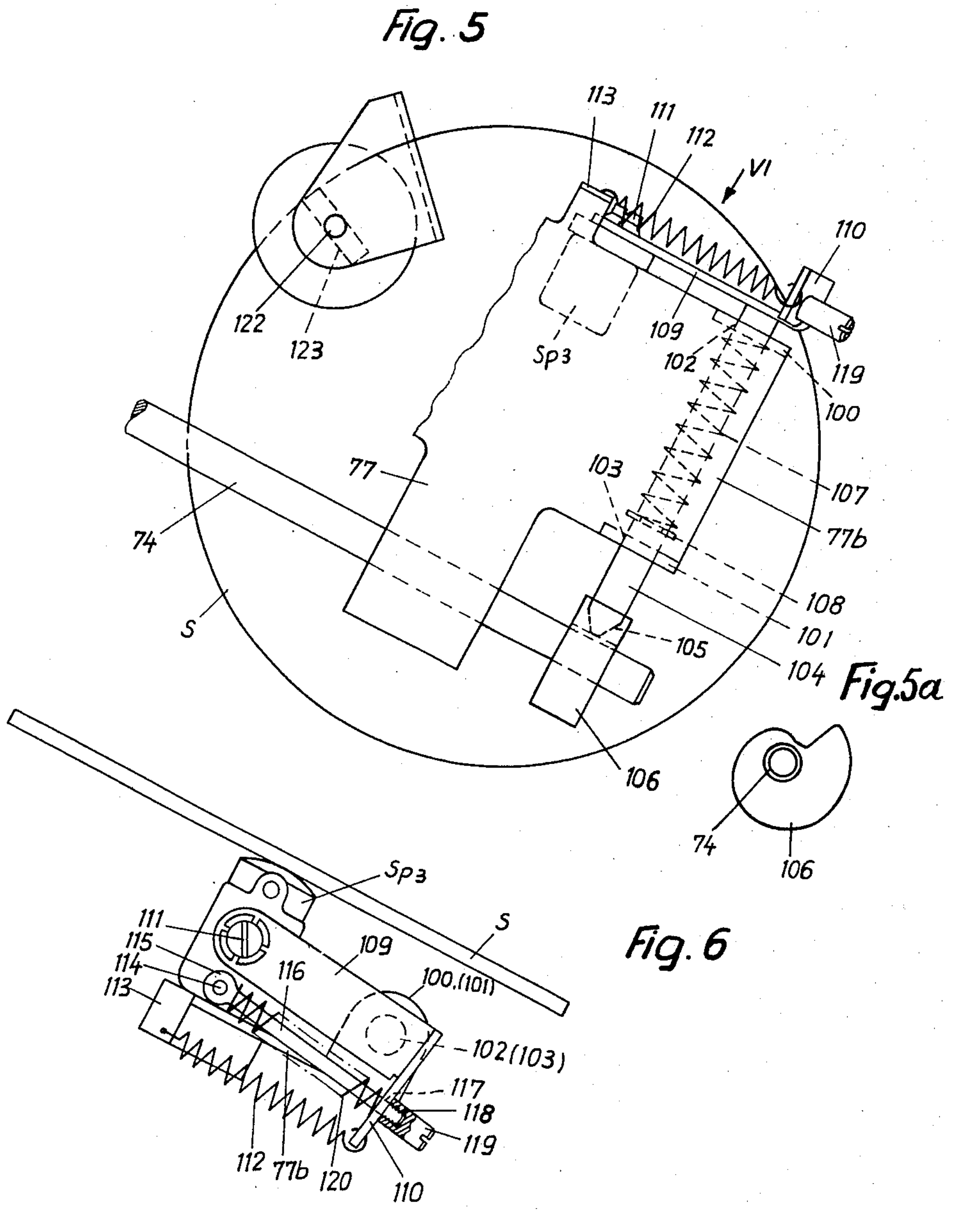
FIG. 5 is a side elevation of the arrangement of the sound transducer head for the second announcement member, on a larger scale.

FIG. 5*a* is an end view of a cam disc thereof, and

FIG. 6 is a plan view of this arrangement looking in the direction of the arrow VI of FIG. 5.

Figure 1:
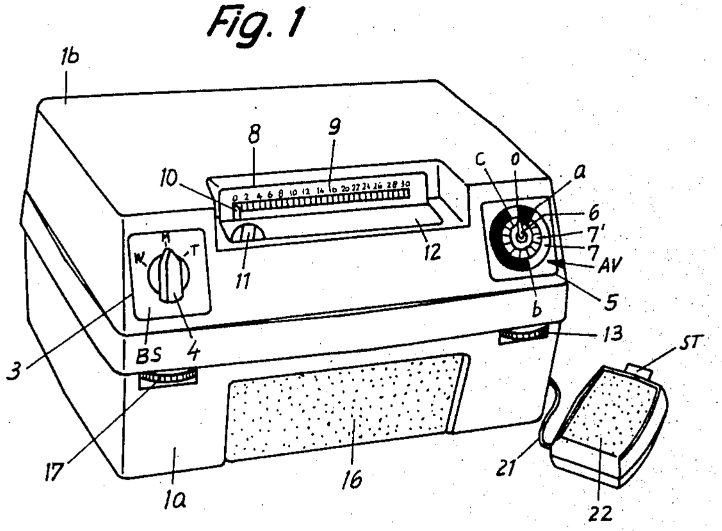
FIG. 1 is a perspective view of a magnetic sound recording and reproducing appliance.

The appliance illustrated has, according to FIG. 1, a bipartite casing of synthetic material, the lower part 1*a* of which is normally connected fixedly to the frame 2 (see FIGS. 2–4), while the upper part 1*b* can be readily removed. On the forward side of the casing portion 1*b* there is visible on the left hand side through a window 3 thereof the control handle 4 of a switch, which is referred to as the operational switch BS and has three switching positions W, M, T. Through a window 5 positioned on the right hand side an indicating device AV is visible, which has a pointer 6 playing over a scale 7, which has white and black segments and will be explained later in more detail.

Through a central elongated window 8 moreover a scale 9 is visible, along which a pointer 10 is movable horizontally, which indicates, how many calls from the public telephone network have already been recorded; for example the present appliance could record a maximum of 30 calls of 20 seconds each. The pointer 10 is arranged below the upper casing portion 1*b* on a slider 11, which is accessible from outside through an elongated horizontal aperture 12 of the casing, which extends along the scale 9.

Below the indicating device AV a segment of a knurled disc 13 projects from the casing. This knurled disc 13 is the actuating member of a network switch NS (see FIG. 3) and of a potentiometer 14, by means of which the sound volume of a loud-speaker 15 can be regulated, in front of which a grid 16 (see FIG. 1) is arranged in the lower portion 1*a* of the casing. Below the switch BS a fixed knurled disc 17 of transparent synthetic material is arranged, the shaping of which corresponds to that of the knurled disc 13 merely for reasons of symmetry. Behind the knurled disc 17 there is provided a signal lamp (not shown) which is switched on any time, when the operational switch BS is in its position T, in which the device is ready for recording an incoming telephone call in the absence of the subscriber. The switching on of the signal lamp lights up the knurled disc 17, which accordingly indicates the readiness of the appliance for operation. A cable 21 leads to a microphone 22 which is provided with a starter key ST. The microphone 22 is used only when it is desired to change an announcement text, i.e. a text to be transmitted by the appliance, to the calling telephone subscriber. Normally the microphone 22 is accordingly not connected to the operational appliance proper, but is stored nearby together with its connecting cable.

For the recording of the incoming calls a recording drum $W_1$ (see FIG. 2) and for the transmission of a first announcement text an announcement drum $W_2$ are provided. Both drums consist on their circumference of a magnetizable material suitable for the magnetic recording and reproducing of sound. Both drums $W_1$ and $W_2$, which are of equal diameter, are rotatably mounted in alignment with one another on a horizontal axle 24 (see FIG. 4) which is fixed relative to the frame. A single motor 25 (see FIG. 4) serves for driving the drums $W_1$ and $W_2$.

When an electromagnet $M_1$ is energized, the drum $W_1$ is set in rotation by means of a coupling and friction gearing (not shown), the drum $W_2$ however is set in rotation through this gearing, when an electromagnet $M_2$ is energized.

With the left hand side of the recording drum $W_1$ a gear 46 is fixedly connected (see FIG. 2), which upon rotation of the drum $W_1$ drives a gear 47' through an endless toothed belt 47, which gear 47' is mounted on the left hand side end of a screw-threaded spindle 48 arranged within a horizontal hollow shaft 49 which runs parallel to the scale 9 indicating the number of calls.

On the hollow shaft 49 the slider 11 is slidably mounted. The slider 11 has a coupling lever 53 (see FIG. 3) which protrudes through a slot 56 of the hollow shaft 49 and normally engages into the screw thread of the threaded spindle 48. An upper part of the coupling lever 53 is constructed as a push key 58, by the depressing of which the coupling lever 53 may be disengaged from the screw-threaded spindle 48, whereafter the slider 11 may be shifted at will along the scale 9 for the number of calls. On the slider 11 a transducer head $Sp_1$ is mounted which is kept in resilient contact with the drum $W_1$, and serves for the recording of the incoming calls on this drum $W_1$, and by switching over the appliance, for the reproduction of the calls recorded on the same.

For the effacing of the calls recorded on the drum $W_1$ an effacer electromagnet $L_1$ (see FIG. 2) is arranged fixedly relative to the frame, which electromagnet extends along the full length of the drum $W_1$. Likewise, for the drum $W_2$ a correspondingly shorter effacer electromagnet (see FIGS. 2 and 4) is arranged fixedly with respect to the frame.

Figure 2:
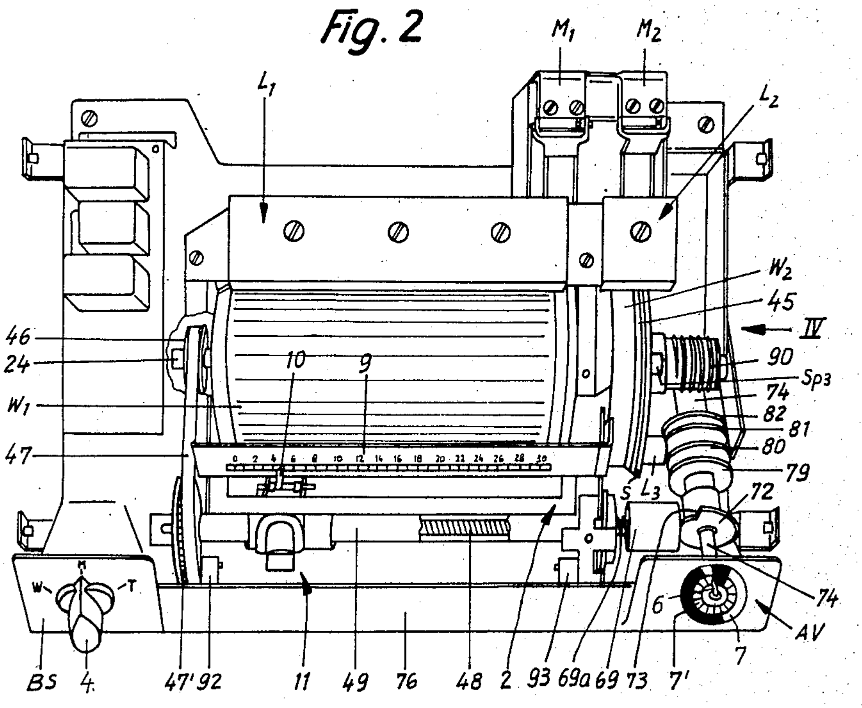
FIG. 2 is a diagrammatic perspective view from above of the appliance, with the casing top portion removed, and partly broken away.
Figure 3:
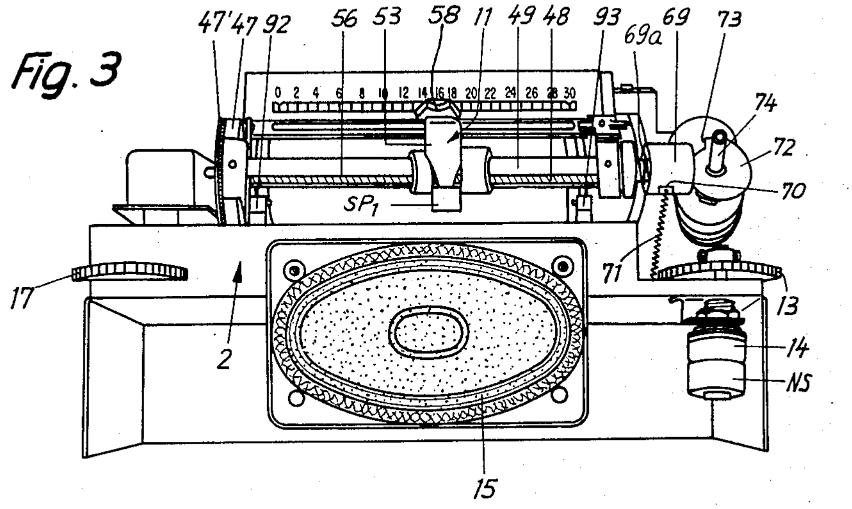
FIG. 3 is a diagrammatic perspective frontal view of the appliance after the removal of the casing and of a front plate.

With the announcement drum $W_2$ there co-operates a transducer head $Sp_2$ (see FIG. 4), which is arranged at the end of an arm 68 of a bushing 69, which is mounted slidably and pivotally on the right hand side end of the hollow shaft 49 (see e.g. FIG. 2). On a further arm 70 of the bushing 69 engages the upper end of a tension spring 71, by which the transducer head $Sp_2$ is kept in contact with the drum $W_2$. The bushing 69 is under the bias of a spring (not shown) which tends to shift the same towards the right, so that its right hand side end is kept in contact with a cam disc 72 (see FIGS. 2 and 3). By turning this cam disc 72 in the clockwise sense of FIG. 3 the bushing 69 is shifted to the left against the bias of the aforesaid spring whereby the transducer head $Sp_2$ is gradually shifted along the drum $W_2$. The cam disc 72 has a step 73 between its largest and its smallest radius. When this step 73 slides past the bushing 69, the latter returns suddenly to its extreme right hand side position under the bias of said spring.

The cam disc 72 is mounted on an inclined shaft 74, which is journalled at its upper end in a bearing 75 arranged behind and on a front plate 76 (FIG. 2). The shaft 74 is journalled near its lower end in a bearing block 77, which is screwed to the right hand side end of the stationary drum axle 24, which for this purpose is provided with a screw-tapped bore 78. On the shaft 74 five further cam discs 79–83 are mounted, which serve for the controlling of sets of contact springs 84—88 fixed to the bearing block 77. On the shaft 74 there is moreover mounted a wormgear 89 meshing with a worm 90, the latter being fixedly connected with the drum $W_2$.

The actual rotational position of the shaft 74 is indicated by a pointer 6 mounted on the upper end of this shaft and playing over the scale 7 of the indicator device AV. At the left hand end and right hand end, respectively, of the path of the slider 11 there is provided a limiting switch 92, 93, respectively, which is illustrated only diagrammatically and is actuated by this slider 11, when its pointer 10 is on the null point or end point, respectively, of the scale 9 for the number of talks.

In addition to the announcement drum $W_2$ a second announcement carrier is now provided in the form of a magnetizable disc S, which is firmly connected by a friction wheel 45 with the first announcement carrier $W_2$, the friction wheel 45, belonging to the aforesaid coupling and friction gearing and, upon energizing of the coupling electromagnet $M_2$ serving for the driving of the drum $W_2$, and now also for the driving of the disc S. Opposite the announcement disc S a transducer head $Sp_3$ and an effacer electromagnet $L_3$ are arranged, the construction and arrangement of which is illustrated in more detail in the FIGS. 5 and 6.

Figure 4:
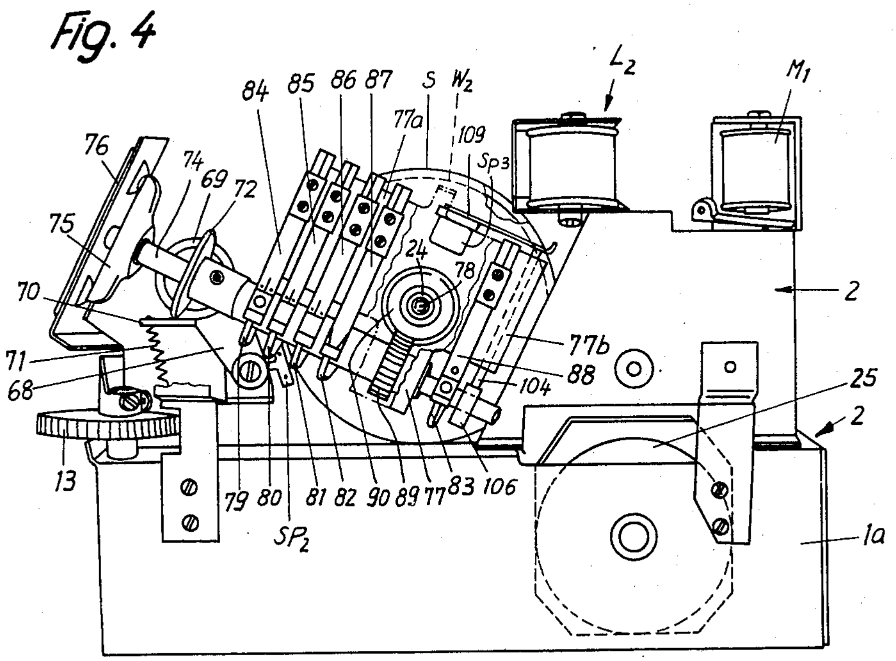
FIG. 4 is a diagrammatic perspective side view of the appliance looking in the direction of the arrow IV of FIG. 2, without the casing and partly broken away.

The bearing block 77, wherein the cam shaft 74 is journalled, has according to FIG. 4 a mounting plate 77*a*, on which the sets of contact springs 84–87 are fitted, and a mounting plate 77*b*, on which the set of contact springs 88 is fitted.

From the mounting plate 77*b*, according to FIGS. 5 and 6 two lugs 100 and 101 are turned up perpendicularly inward, each provided with a hole 102, 103, respectively, wherein a sensing pin 104 is guided, the lower reduced end of which senses a cam disc 106, which is fitted on the shaft 74, additionally to the cam discs 72 and 79–83 (not shown again in FIG. 5) and may be, if desired, integral with the cam disc 83. The sensing pin 104 is under the bias of a spring 107 which on top abuts the lug 100 and, at the bottom, abuts a spring plate 108 fixed to the sensing pin 104, and consequently keeps the sensing end 105 in contact with the cam disc 106.

At the upper end of the sensing pin 104 a two-armed lever 109, 110 is fixed, and at the end of one arm 109, of this lever the transducer head $Sp_3$ is mounted pivotally about an axle 111. At the end of the other arm 110 of the lever 109, 110 there engages a spring 112, which is attached on the other hand to a turned up upper extension 113 of the mounting plate 77*b*.

It will be seen that the spring 112 tends to turn the lever 109, 110 arranged on top of the sensing pin 104 in the clockwise sense of FIG. 6, and consequently to keep the transducer head $Sp_3$ in contact with the announcement disc S.

In order to prevent an uncontrollable turning of the transducer head $Sp_3$ about its axle 111, a pin 114 is arranged on the same on which the head 115 of a pin 116 is pivoted which passes freely through a hole 117 of the lever arm 110 and is provided on its free end with a screw thread 118, on which a nut 119 is screwed. A spring 120, which abuts on the one hand the bolt head 115 and on the other hand the lever arm 110, tend to turn the transducer head $Sp_3$ in the clockwise sense of FIG. 6 about its axle 111, and it is clear, that by turning the nut 119 the position of the transducer head $Sp_3$ can be adjusted. The pin 114, bolt 116 and spring 120 are not shown in FIG. 5, since the same are practically hidden by the spring 112. Moreover, in FIG. 5 the sets of contact springs 84–88 are not shown and the mounting plate 77 is broken off, in order not to encumber this figure unnecessarily. On the other hand the effacer head $L_3$ arranged behind the mounting plate 77*a* is shown, which is fixed to a stationary bracket of the frame and has a T-shaped core 122; the head 123, forming the horizontal bar of the T extends substantially radially over the annular zone of the disc S serving for the recording.

The cam disc 106 shown also in FIG. 5 in end view has in principle the same shape as the cam disc 72 (see FIG. 2) i.e. its radius increases gradually from a smallest to a largest value and drops suddenly back to this smallest value. At one revolution of the cam shaft 74 the transducer head $Sp_3$ is shifted owing to the movement of the sensing pin 104, which movement is radial with respect to this shaft 74, the transducer head $Sp_3$ moving almost radially with respect to the axle 24, about which the announcement disc S rotates, when the coupling electromagnet $M_2$ is energized, so that the transducer head scans an annular zone of the announcement disc S, which is used for the recording and reproducing of the second announcement text.

The appliance now described has the following advantage over the similar appliance without announcement disc S and associated components. When after the recording of thirty calls of 20 seconds each, there is no more space available on the recording drum $W_1$ for further recordings, the limiting switch 93 actuated by the slider 11 does not simply switch off the appliance, so that the calling subscriber simply bears his calling signal, as if the called subscriber had only an ordinary telephone connection without a recording and reproducing-applance. On the contrary the limiting switch 93, when actuated by the slider 11, connects the transducer head $Sp_3$ instead of the transducer head $Sp_2$, so that from the thirtyfirst call onward the caller hears the announcement text recorded on the announcement disc S instead of that recorded on the announcement drum $W_2$.

The appliance is used mainly in two operational conditions, namely:

(1) Telephone operation.

(2) Reproducing operation.

In addition to these two main operational conditions four more operational conditions are possible, namely:

(3) Recording of a text on the announcement drum $W_2$.

(4) Checking the text recorded on the announcement drum $W_2$.

(5) Recording of a text on the announcement disc S.

(6) Checking the text recorded on the announcement disc S.

Moreover in the main operational condition of "Telephone operation" two cases are possible, depending on whether the announcement drum $W_2$ or the announcement disc S operates.

For all six operational conditions the network switch NS has to be switched on by means of the knurled disc 13. When the network switch NS is switched off, the appliance is inoperative, i.e. it has no influence on the operation of the telephone apparatus, although it is permanently connected to the telephone line by a cable (not shown).

1. *Telephone operation*

When the telephone subscriber wants to leave, he has merely to switch on the network switch NS by means of the knurled disc 13 and to set the handle 4 of the operational switch BS into the position T ("Telephone operation"). The lighting up of the transparent knurled disc 17 indicates, that the appliance is ready for the recording of the incoming telephone calls. When now in the abseence of the subscriber a call is made, the appliance will operate in the manner described in detail in such a way that firstly by means of the transducer head $Sp_2$ a first part of the announcement text recorded on the announcement drum $W_2$ is transmitted to the caller, e.g.:

"Mr. Willy Müller will be absent until tomorrow 8 a.m. You may for 20 seconds transmit a message which will be recorded. Please speak."

This first part of the announcement is made during the time interval, in which the pointer 6 of the indicating device AV (see FIG. 1), which at the beginning of the calling cycle had been on the mark O of the scale 7, moves from the mark *a* to the mark *b*. In the time interval during which the pointer 6 moves from the mark *b* to the mark *c*, the caller may transmit a message, which is recorded by the transducer head $Sp_1$ on the recording drum $W_1$. While the pointer 6 moves from the mark *c* to the mark *o*, a second and last part of the announcement text contained on the announcement drum $W_2$ is transmitted namely "Appliance switched-off," whereafter the appliance is ready for the next call cycle.

When the recording drum $W_1$ has been fully utilized and the slider 11 has acuated the limiting switch 93, upon a further call no longer the transducer head $Sp_2$ comes into operation, but the transducer head $Sp_3$ which for example makes the following announcement to the caller:

"Mr. Willy Müller can be reached daily by telephone between 8 a.m. and noon, and between 2 and 6 p.m. Please call during the periods indicated."

The appliance accordingly serves during the first thirty call cycles as a "Call answering appliance recording an incoming call," while during the later call cycles it functions as a "Call answering appliance without recording an incoming call," i.e. it combines the functions of two different kinds of appliances known hitherto.

The telephone subscriber can without difficulty, when he wants to leave, adjust the appliance from the beginning so that it transmits only the second announcement text, i.e. that it does not receive any recordings at all. For this purpose the subscriber has merely, before leaving to uncouple the slider 11 from the screw-threaded spindle 48 by depressing the key 58 and to shift the slider 11 to the right into its end position so that it actuates the limiting switch 93. This possibility is particularly valuable, when the subscriber is absent for a prolonged time, so that he could not possibly within useful time reproduce any messages recorded in his absence. In this case the second announcement text may be as follows:

"Mr. Willy Müller will be absent until November 30th and cannot be reached by this telephone. Urgent messages will be received by Mr. Huber Telephone No. 66–45–31."

2. *Reproducing operation*

For reproducing the calls recorded, the subscriber has to disengage the slider from the screw-threaded spindle 48 by depressing the key 58, and to shift the same to the left into the null position. With the network switch NS switched on and with the grip 4 of the operational switch BS adjusted to W ("Reproduction"), the modulated currents generated by the transducer head $Sp_1$ by scanning this drum $W_1$ are supplied to the loud speaker 15. When the subscriber wishes to hear a message again, he has merely to depress the key 58 and to shift the slider back to that recorded call, watching the pointer 10.

The sound volume control 14 which is actuated by turning the knurled disc 13, is operative only in this operational condition, and not for the checking of the announcement texts to be described later.

3. *Recording of a text on the announcement drum $W_2$*

The grip 4 of the operational switch BS is set into the position M ("Microphone") and care has to be taken that the slider 11 does not stand in the end position ("Call No. 30"). Moreover the microphone 22 (not needed in the main operational conditions 1 and 2) is now connected by its cable 21 to the operational appliance proper.

By a short depressing of the starter key ST provided on the microphone 22, the motor 25 and the coupling electromagnet $M_2$ are now energized, so that the announcement drum $W_2$ is set in rotation, while now the pointer 6 of the indicating device turns from *o* to *a* on the scale 7, the effacing of the former announcement text is carried out by energizing the effacer electromagnet $L_2$.

While the pointer 6 moves over the first white segment of the scale, beginning at *a*, to *b*, the subscriber has to speak into the microphone 22, whereby the modulated currents are supplied to the transducer head $Sp_2$, and the recording of the new announcement text is carried out.

By watching the pointer 6, the subscriber takes care to pronounce the words:

"Talk, please" immediately before the pointer 6 has reached the position *b*.

As soon as the pointer reaches the position *c*, the subscriber must pronounce the final words "Appliance switched-off" (or to this effect), while the pointer moves over the second white segment of the scale to *d*, whereafter the switching off of the motor, of the circuit and of the coupling elecromagnet $M_2$ takes place.

*4. Checking the text recorded on the announcement drum $W_2$*

The grip 4 of the operational switch BS is set into the position W ("Reproduction") care is to be taken again that the slider 11 does not stand in the end position.

By short depression of the starter key ST of the microphone 22, which is connected also for the checking, the announcement drum $W_2$ is again set in rotation.

The transducer head $Sp_2$ scans this drum, whereby the modulated currents are supplied to the loudspeaker. When this check, carried out while watching the pointer 6, shows that the announcement text is in order, the microphone 22 is stored away and the network switch NS is switched off.

*5. Recording of a text on the announcement disc S*

The grip 4 of the operational switch BS is again set to the position M, the microphone being connected up, while this time care has to be taken that the slider 11 is in the end position so that the limiting switch 93 is actuated. While the pointer 6 moves from *a* to *o* over a scale 7' coaxial with the scale 7 and equally divided by marks, the announcement disc S can be covered by recording. It is clear that the second announcement text may be considerably longer than the first announcement text since also the period (between *b* and *c*, scale 7) is available, which otherwise is intended for the recording of an incoming call.

*6. Checking the text recorded on the announcement disc S*

The checking of the text on the announcement disc is carried out in the same manner as that of the text of the announcement drum $W_2$, merely with the difference, that the slider 11 has again to be in its end position the same as for the recording of the announcement text on the announcement disc S.

While the appliance described hereinabove is a magnetic sound appliance, the invention is likewise applicable, when the recordings on the record carrier and/or on the two announcement carriers are made in any other way; for example in principle the first announcement text could be recorded once and for ever on an announcement carrier having sound grooves, and contain only the invitation to speak and the final announcement without containing in the first announcement text the additional freely selectable announcement such as: "Mr. Willy Müller will be absent until tomorrow 8 a.m." given hereinabove by way of example. The possibility that the owner of the appliance proper can freely vary not only the announcement text of the second announcement carrier but also that of the first announcement carrier is however so advantageous that in practice it will hardly ever be dispensed with, inasmuch as on the appliance described with magnetic sound carrier it requires only quite a negligible extra expense.

In the operation of the telephone apparatus, it is necessary that when a call arrives that the motor 25 is energized, thereupon the electromagnet $M_2$ is energized and the drum $W_2$ is caused to rotate by means of a not illustrated coupling and operating gearing.

Almost at the same time or briefly thereafter the electromagnet $M_1$ is energized which causes a rotation of the drum $W_1$ so that now the incoming message is recorded upon the transducer $Sp_1$. After the pointer 6 has made one rotation and at the end of its rotation the message "device shut off" transmitted to the calling subscriber, then the magnets $M_1$ and $M_2$ are de-energized and the drums $W_1$ and $W_2$ are caused to stop and the motor 25 is disconnected.

During the reproducing operation only the drum $W_1$ is caused to rotate, for which purpose the motor 25 is set into operation and the electromagnet $M_1$ is energized. During the recording of the message upon the announcing drum $W_2$ only this drum $W_2$ is driven by the motor 25 and this is caused by the energization of the electromagnet $M_2$. The same holds true during the control of the message recorded upon the drum $W_2$ and also during the recording of the message upon the disc S and during the control of this message because the announcer disc S is rigidly connected with the drum $W_2$.

While I have described herein and illustrated in the accompanying drawings what may be considered a typical and particularly useful embodiment of my said invention I wish it to be understood that I do not limit myself to the particular details and dimensions shown and illustrated; for obvious modifications will occur to a person skilled in the art.

What I claim as my invention and desire to secure by Letters Patent, is:

1. A recording and reproducing appliance adapted for use with a public telephone network, comprising in combination: a first answering and announcement carrier drum and a first transducer cooperating therewith, a second record carrier drum and a second transducer cooperating therewith, the first carrier drum being povided with a message instructing the calling subscriber to speak, the second carrier drum having a message receiving record, a shaft, said carriers being supported by said shaft and adapted to be actuated in sequence, motor means for driving said drums, a traversing shaft driven by said first named drum, a slide actuated by said traversing shaft for supporting said record carrier transducer for said second drum, a cam shaft driven by said second drum, means on said cam shaft to move said first transducer over its corresponding message carrying area, clutch means controlled by said first cam shaft for drivingly connecting said answering carrier to said motor means for a predetermined time period, clutch means controlled by said cam shaft for connecting the motor means to the second record carrier drum after a predetermined time period, a message carrier disc, means for drivingly connecting said second message carrier disc to said first message carrier drum, means on said cam shaft to indicate the position thereof, a transducer for said message carrier disc, means on said cam shaft for controlling the movement of said last named transducer, and means engageable by said slide after the transducer supported thereby has traveled the length of said record carrier to interrupt actuation of the transducer of said record carrier drum and to actuate the transducer of said message carrier disc.

2. An appliance as set forth in claim 1 in which said answering and recording carriers are of the magnetic type and their associated transducers are of the magnetic pick-up type.

3. An appliance as set forth in claim 2 in which said last named means comprises a limiting switch which when actuated by said slide switches said second announcement carrier transducer into operation, instead of said first announcement carrier transducer, said slide in its end position corresponding to the recording capacity of said record carrier when the recording area is exhausted being adapted to automatically actuate said limit switch, a pointer attached to said slide, a fixed scale adjacent said record carrier over which said pointer is movable to indicate on said scale the number of messages recorded on said record carrier, the means on said cam shaft indicating the position thereof being adapted to manually operate said slide at will, and a control knob on said slide for shifting the same into the end position regardless of the number of records and messages recorded.

4. A recording and reproducing appliance adapted for use with a public telephone network, comprising in combination: a first magnetizable answering and announcement carrier drum and a first transducer head cooperating therewith, a record carrier drum and a second transducer head cooperating therewith for recording a message by a calling subscriber, a shaft for supporting said drums, motor means drivingly connecting said drums, a cam shaft, means drivingly connecting said second named drum to said cam shaft, means actuated by said cam shaft for moving the transducer of said record carrier drum to two positions instructing the calling subscriber to speak in an initial position and advising the subscriber after a predetermined recording period that the record carrier drum and its transducer are disconnected whereby said appliance will be in condition for another calling cycle as long as recording space is available on said record carrier drum, a second magnetizable disc-shaped announcement carrier connected with said first announcement carrier, a third transducer head cooperating with said second announcement carrier, a cam disc mounted on said cam shaft, a sensing pin yieldingly urged against said cam disc and operatively connected to said third transducer head for shifting the same in a direction substantially radially relative to the common axis of said two announcement carriers, a traverse shaft mounted in front of said record carrier drum, a slide on said traverse shaft, means on said slide for supporting said record carrier drum transducer and means engageable by said slide after said transducer has traversed the length of said drum for automatically substituting actuation of said second announcement carrier disc for said first announcement carrier drum when the recording space on said record carrier is exhausted so that a message to the calling subscriber will be transmitted the text of which may be varied according to different circumstances, and manually operable control means on said cam shaft and slide, said cam shaft being provided with indicating means to indicate the cyclic position of said cams.

5. A recording and reproducing appliance as set forth in claim 4, a second cam disc mounted on said cam shaft operatively connected to said first transducer for moving the same along said answering and announcement carrier drum, a series of cam discs mounted on said cam shaft, a set of contact springs cooperating with said series of cam discs in performing the switching operations required during the course of a telephone calling cycle, a microphone connected to said first and third transducers, and a fixed scale associated with said indicator having segments indicating when the announcement text to be recorded on said first and second announcement carriers may be spoken into said microphone.

6. A recording and reproducing appliance as set forth in claim 4, comprising a pivot axle, a lever pivotally mounted on said pivot axle and carrying said sensing pin and said third transducer, spring means for yieldingly biasing said lever for permitting the adjusting and fixing of the position of said third transducer relative to said pivot axis, and a spring for yieldingly urging said lever in a direction to maintain said third transducer in contact with said announcement carrier disc.

References Cited by the Examiner

UNITED STATES PATENTS

| | | | |
|---|---|---|---|
| 2,080,812 | 5/1937 | Fairbanks | 179—6 |
| 2,761,899 | 9/1956 | Keith | 179—6 |

BERNARD KONICK, *Primary Examiner.*

IRVING L. SRAGOW, *Examiner.*

J. P. SCHERLACHER, G. LIEBERSTEIN, *Assistant Examiners.*